(No Model.) 2 Sheets—Sheet 2.

C. E. BURROUGHS & N. P. OTIS.
SAFETY DEVICE FOR ELEVATORS.

No. 543,642. Patented July 30, 1895.

Witnesses
Jno. G. Hinkel
J. A. Fairgrieve

Inventors
N. P. Otis
Chas. E. Burroughs
By Foster & Freeman
Attorneys

UNITED STATES PATENT OFFICE.

CHARLES E. BURROUGHS AND NORTON P. OTIS, OF YONKERS, ASSIGNORS TO THE OTIS BROTHERS & COMPANY, OF NEW YORK, N. Y.

SAFETY DEVICE FOR ELEVATORS.

SPECIFICATION forming part of Letters Patent No. 543,642, dated July 30, 1895.

Application filed November 17, 1894. Serial No. 529,157. (No model.)

*To all whom it may concern:*

Be it known that we, CHARLES E. BURROUGHS and NORTON P. OTIS, citizens of the United States, residing at Yonkers, in the county of Westchester and State of New York, have invented certain new and useful Improvements in Safety Devices for Elevators, of which the following is a specification.

Our invention has for its object to automatically arrest the cage of an elevator in case it should attain an undue speed and to secure the resetting of the arresting devices when the cage is raised; and to this end we provide the cage with certain safety appliances, fully set forth hereinafter, and as illustrated in the accompanying drawings, in which—

Figure 1:
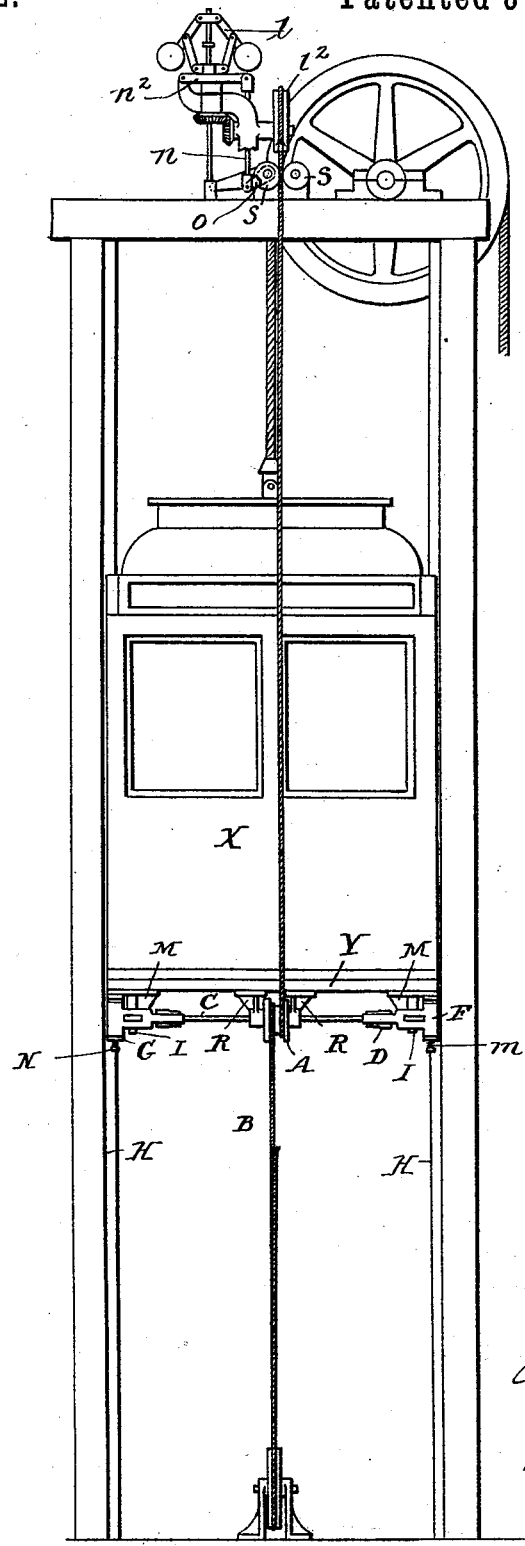
Figure 2:
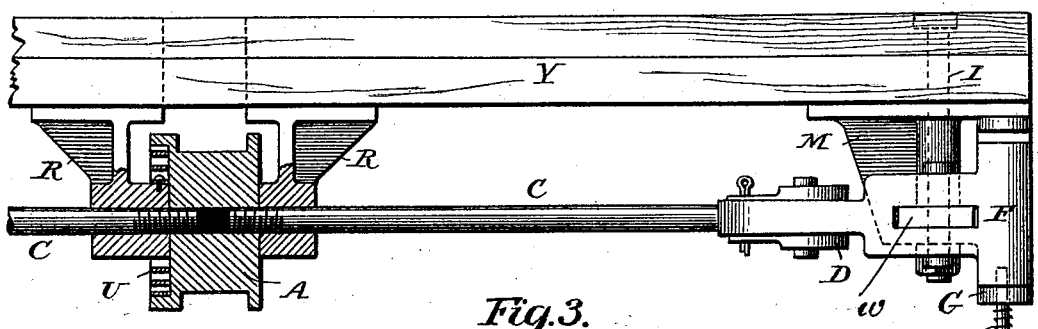
Figure 3:
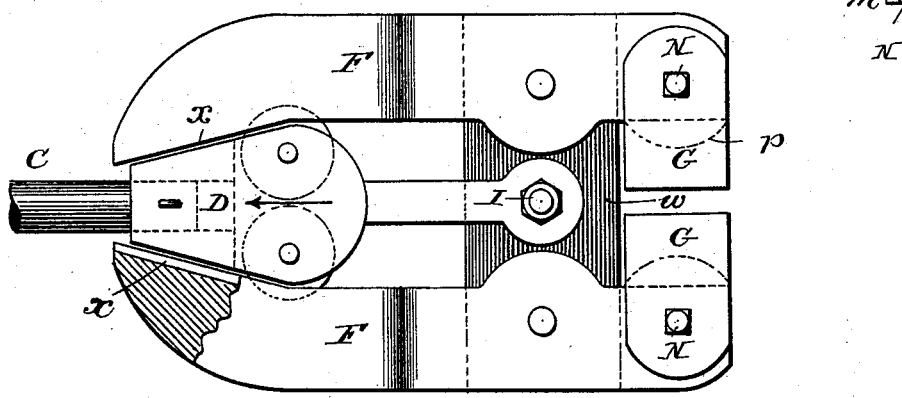
Figure 4:
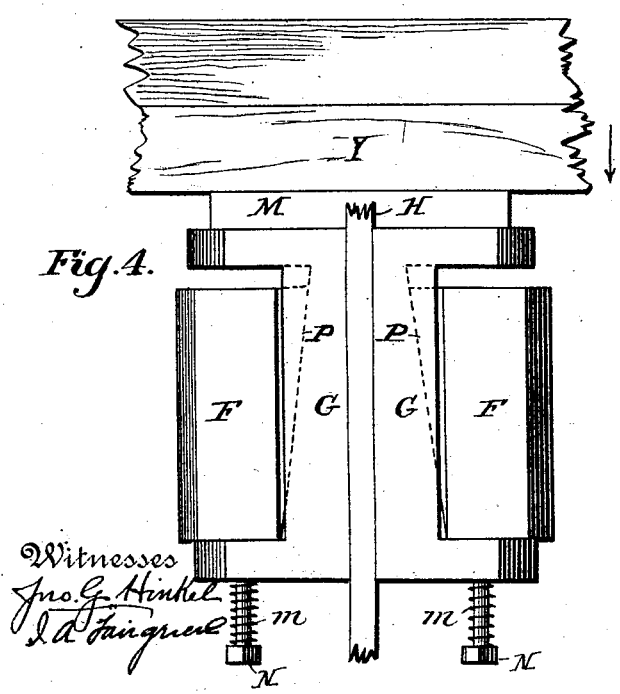
Figure 5:
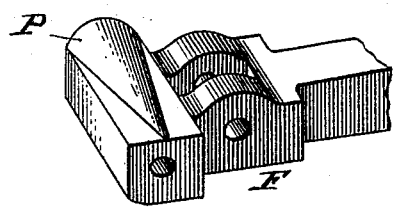

Figure 1 is an elevation of an elevator apparatus provided with our improved safety device. Fig. 2 is an enlarged view of the elevator-platform bar and its adjuncts. Fig. 3 is an inverted plan view of a part of Fig. 2. Fig. 4 is an end view of the parts shown in Fig. 2. Fig. 5 is a perspective view of a clamping end of one of the levers.

X illustrates the cage or platform and Y the bottom platform-bar, and beneath which, near each end, is a bracket M, through which extends downwardly a bolt I, to which a cross-plate $w$, supported by the bolt in a slot of the bracket M, is connected. Pivoted to the cross-plate $w$ are levers F F, the inner ends of said levers having converging faces $x\ x$, receiving between them a wedge D. Preferably the wedge is provided with two antifriction-rollers, each of which extends into a groove the bottom of which constitutes the bearing-face $x$ for the edge of the roller, the whole being so arranged that if the wedge D is drawn back in the direction of the arrow the inner ends of the levers will be spread apart and the forward ends or jaws will be brought toward each other.

To each lever F a shoe G is so connected to the lever that it can have a slight vertical movement independent of the said lever. A spiral spring $m$ upon a bolt N, extending downward from the end of each lever F through a flange in the shoe G, serves normally to maintain the shoe at the limit of its upward motion. Each shoe G has an inclined bearing adapted to an inclined bearing-face upon the adjacent lever F. These bearings may be flat, but preferably they are semi-conical, as best illustrated in Fig. 4, where the lever F is shown as provided at its outer end with a semi-conical projection P, constituting the bearing for the adjacent shoe, which has a corresponding semi-conical recess. This semi-conical bearing serves to unlock the shoes, as described hereinafter, and permits the shoes to accommodate themselves to the faces of the guide whatever may be the positions of the levers.

In combination with the parts above described we employ means whereby in case the downward movement of the cage at any time is too rapid the wedges D D will be drawn inward, so as to spread apart the rear ends of the levers F and bring the forward ends closer together, so as to cause each shoe G to be brought into firm frictional contact with the face of the guide, when the said shoe will adhere to said face and each shoe be tightly wedged between the lever and the guide as the descent of the cage continues, thereby securing a strong biting effect of the shoes upon the guide and the final arrest of the cage. If, after the cage has been thus arrested it is desired to release it, it is sufficient to raise it to a slight extent when each of the shoes G will adhere frictionally to the face of the guide for a moment until the cage and the levers F have risen sufficiently to carry the inclined face of each lever from the inclined face of the adjacent shoe, thereby unlocking or unbinding the shoes, when the latter will at once descend and will be thrown downward to its lowermost position by the action of the spring $m$, and will then be in place for a repetition of the above described operations should the speed of the cage become too great on its subsequent descent.

While different means may be employed for moving the wedges D, we prefer that illustrated in the drawings, which is as follows: Between two brackets R R, at the under side of the platform-bar Y, there is a drum A, round which is coiled a rope or cable B, which passes upward over a guide-pulley $l^2$ and between two geared eccentrics $s\ s'$. Connected to the shaft of the eccentric $s$ is a lever $o$, which is in turn connected by a rod $n$ to the operating-lever $n^2$ of an ordinary ball-governor $l$. This governor is driven by gears from the shaft of the guide-pulley $l^2$, and when the cage acquires any unusual speed will raise the lever $n^2$, bring the eccentrics upon the cable B and arrest or retard its movement, which will have the effect of rotating the drum A. Thus it will be seen that in the normal operation of the present invention the cable B travels with the car and does not effect the drum A; but when the car attains an abnormally high speed the governor will throw the eccentrics $s$ $s'$ into contact with the cable and cause its movement to be retarded or arrested and the drum to be moved to operate the arresting devices.

Through the drum A extends a recess threaded with reverse threads at the opposite ends, and into each end of said recess extends a threaded rod C, which has a sliding bearing in the adjacent bracket R, and which is connected at the opposite end to the adjacent wedge D.

So long as the elevator apparatus is working correctly the parts retain the position illustrated in Fig. 1; but should the eccentrics $s$ $s'$ be caused to clamp the rope B, in consequence of the too rapid movement of the cage, the drum A will be turned and each of the rods C will be drawn inward in the direction of the arrow, Fig. 3, carrying with it the connected wedge D and spreading apart the inner ends of the levers F, bringing the outer ends together and causing the shoes to clamp the guides, as above set forth.

It is of course necessary to set the drum A back to its original position in case the positions of the parts are to be restored for further action, and we therefore make use of a flat coiled spring U, which lies in a recess in the end of the drum A, one end being connected to the drum and the other to a stationary support, as the bracket R, which spring is coiled or tightened when the drum A is turned in consequence of the arrest of the cable B. When the shoes G are loosened by the lifting of the cage, as above described, they take their lower positions and relax the friction which before tended to bind the parts in place, and the spring U is then free to act to restore the drum to its proper position.

We have found that ordinary coiled springs for restoring the parts to place are far less effective than a flat coiled spring bent upon itself as above described, and that the latter will retain its resiliency for an indefinite period and act with a uniformity which cannot be secured by a spiral spring of the ordinary character.

While we have referred to two levers F F and two shoes G G as being arranged in connection with each one of the guides, it will be evident that the part corresponding to one of the levers and one of the shoes may be stationary, constituting part of the bracket, and that only one lever and one shoe may be used in connection with each guide. It will also be evident that the wedge D may be used without the antifriction-rolls E, which practically, in connection with the converging faces $x$ $x$, constitute a wedge for the purpose of separating the inner ends of the levers.

Without limiting ourselves to the precise construction and arrangement of parts described, we claim as our invention—

1. The combination with an elevator cage or platform, of brackets, levers F, F supported thereon, a shoe connected with each lever so as to have a limited vertical movement, each shoe having an inclined bearing upon one of the levers, and means for automatically carrying the levers and shoes toward the guides when the cage travels at an undue speed, substantially as set forth.

2. The combination with a cage or platform of an elevator, of levers F, each provided with a semi-conical bearing, a shoe having a corresponding recess and connected to each lever to have a limited vertical movement, and means for moving the levers to bring the shoes against the guide when the cage attains an undue speed, substantially as set forth.

3. The combination with the cage or platform, of levers F, F, and shoes G, each shoe connected to one of the levers at the outer end, with a semi-conical projection P upon each lever adapted to a corresponding recess in the shoe carried by the lever, substantially as set forth.

4. The combination of the cage or platform, levers F, shoes G, having inclined bearings upon the levers and capable of limited vertical movements, and bolts N extending from the levers through parts of the shoes and provided with springs $m$, substantially as set forth.

5. The combination of the levers F, F, and shoes G, the levers having converging faces $x$, and wedges D adapted to said converging faces, bars C connected to said wedges, and having threaded ends, a drum A having threaded recesses adapted to receive the bars, a traveling cable wound on said drum and devices for retarding or arresting the movement of said cable when the cage attains an undue speed, and a governor for actuating said devices, substantially as described.

6. The combination with the levers, shoes, wedges, drum A and connecting rods C, of a spring connected with the drum A to turn it in one direction, substantially as set forth.

7. The combination of the cage, levers, shoes, wedges, connecting rods, and governor and cable B, of a drum A for receiving said cable having a recess at one end, and a flat spring coiled within said recess and connected at one end with the drum and at the other with a stationary part of the apparatus, substantially as set forth.

8. The combination with an elevator cage or platform, levers F, F, supported thereon, a shoe connected with each lever so as to have a limited downward movement, means for normally maintaining the shoes at the limit of their upward movements and means for automatically carrying the levers and shoes toward the guides when the cage travels at an undue speed, substantially as described.

In testimony whereof we have signed our names to this specification in the presence of two subscribing witnesses.

CHAS. E. BURROUGHS.
    NORTON P. OTIS.

Witnesses:
 WALTER E. HODGMAN,
 GEORGE D. ROSE.